United States Patent
Tu et al.

(10) Patent No.: US 10,297,268 B2
(45) Date of Patent: *May 21, 2019

(54) VOICE SIGNAL PROCESSING APPARATUS AND VOICE SIGNAL PROCESSING METHOD

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,379

(22) Filed: Nov. 2, 2017

(65) Prior Publication Data

US 2018/0226087 A1 Aug. 9, 2018

(30) Foreign Application Priority Data

Feb. 8, 2017 (TW) .............................. 106104067 A

(51) Int. Cl.

| G10L 21/02 | (2013.01) |
|---|---|
| G10L 21/0272 | (2013.01) |
| G10L 19/26 | (2013.01) |
| G10L 15/02 | (2006.01) |
| G10L 25/93 | (2013.01) |
| H04R 25/00 | (2006.01) |
| G10L 21/003 | (2013.01) |
| G10L 25/09 | (2013.01) |

(52) U.S. Cl.
CPC .......... *G10L 21/0272* (2013.01); *G10L 15/02* (2013.01); *G10L 19/26* (2013.01); *G10L 21/02* (2013.01); *G10L 25/93* (2013.01); *H04R 25/50* (2013.01); *G10L 21/003* (2013.01); *G10L 25/09* (2013.01); *G10L 2025/937* (2013.01); *H04R 2225/43* (2013.01)

(58) Field of Classification Search
USPC ............................................... 704/7–10, 200
See application file for complete search history.

(56) References Cited

U.S. PATENT DOCUMENTS

| 7,546,237 | B2 * | 6/2009 | Nongpiur | ............ | G10L 21/0364 704/209 |
|---|---|---|---|---|---|
| 2016/0365099 | A1 * | 12/2016 | Pandey | ................ | G10L 21/0205 |
| 2017/0047080 | A1 * | 2/2017 | Shiga | .................. | G10L 21/0208 |

FOREIGN PATENT DOCUMENTS

| TW | 092619 | 11/1987 |
|---|---|---|
| TW | I557728 | 11/2016 |

* cited by examiner

*Primary Examiner* — Leonard Saint Cyr
(74) *Attorney, Agent, or Firm* — JCIPRNET

(57) ABSTRACT

A voice signal processing apparatus and a voice signal processing method are provided. Adjust a consonant signal judgment condition of a target voice frame according to whether an original voice sampling signal corresponding to a previous voice frame adjacent to the target voice frame is a consonant signal, so as to improve comfort of listening to the sound and recognition of a voice signal.

16 Claims, 3 Drawing Sheets

US 10,297,268 B2

VOICE SIGNAL PROCESSING APPARATUS AND VOICE SIGNAL PROCESSING METHOD

CROSS-REFERENCE TO RELATED APPLICATION

This application claims the priority benefit of Taiwan application serial no. 106104067, filed on Feb. 8, 2017. The entirety of the above-mentioned patent application is hereby incorporated by reference herein and made a part of this specification.

BACKGROUND OF THE INVENTION

Field of the Invention

The invention relates to a signal processing apparatus, and particularly relates to a voice signal processing apparatus and a voice signal processing method.

Description of Related Art

Generally, the hearing impaired cannot clearly receive a voice signal with a higher frequency, for example, a consonant signal, but can clearly hear a voice signal with a lower frequency. To make the hearing impaired to clearly hear the voice signal, when the voice signal is determined to be a consonant signal, a processing of frequency down-conversion is performed to the voice signal. Conversely, when the voice signal is not the consonant signal, the frequency down-conversion is not performed. In this way, although the hearing impaired is aided to clearly hear the voice signal, when other noise signal in the environment causes a judgement error of the consonant signal, the consonant signal originally required to be down-converted is not down-converted. When the consonant signal that is not down-converted is appeared in the tandem down-converted consonant signals, the sound is intermittent, which causes discomfort of a user, or even recognition of the voice signal is probably influenced.

SUMMARY OF THE INVENTION

The invention is directed to a voice signal processing apparatus and a voice signal processing method, which effectively mitigate a problem of sound intermittence caused by consonant signal misjudgement, so as to improve comfort of listening to a sound and recognition of a voice signal.

The invention provides a voice signal processing apparatus including a bandpass filter unit and a processing unit. The bandpass filter unit performs bandpass filtering of a first frequency band and a second frequency band to a voice signal, so as to respectively generate a first bandpass filter signal and a second bandpass filter signal, where at least one of the first frequency band and the second frequency band is a consonant frequency band. The processing unit is coupled to the bandpass filter unit, and divides the voice signal, the first bandpass filter signal and the second bandpass filter signal into a plurality of voice frames, and calculates energy of sampling signals in the voice frames, so as to obtain original voice sampling signal energy, first frequency band signal energy and second frequency band signal energy corresponding to the voice frames, and adjusts a consonant signal judgement condition of a target voice frame according to whether an original voice sampling signal corresponding to a previous voice frame of the target voice frame is a consonant signal, where the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal, where when the original voice sampling signal corresponding to the previous voice frame of the target voice frame is the consonant signal, the processing unit determines whether the original voice sampling signal corresponding to the target voice frame is the consonant signal according to a first ratio between a sum of the first frequency band signal energy and the second frequency band signal energy corresponding to the target voice frame and the original voice sampling signal energy corresponding to the target voice frame, and a second ratio between the sum of the first frequency band signal energy and the second frequency band signal energy corresponding to the target voice frame and a sum of the first frequency band signal energy and the second frequency band signal energy corresponding to the previous voice frame of the target voice frame.

In an embodiment of the invention, the processing unit further calculates a zero crossing rate of the target voice frame, where when the original voice sampling signal corresponding to the previous voice frame of the target voice frame is the consonant signal, the processing unit further determines whether the original voice sampling signal corresponding to the target voice frame is the consonant signal according to the zero crossing rate of the target voice frame, where when the zero crossing rate of the target voice frame is greater than a predetermined zero crossing rate, the first ratio is greater than a first predetermined value and the second ratio is greater than a second predetermined value, the original voice sampling signal corresponding to the target voice frame is the consonant signal.

In an embodiment of the invention, when the zero crossing rate of the target voice frame is greater than the predetermined zero crossing rate and the first ratio is greater than a third predetermined value, the original voice sampling signal corresponding to the target voice frame is the consonant signal, where the third predetermined value is greater than the first predetermined value.

In an embodiment of the invention, when original voice sampling signals corresponding to previous two voice frames of the target voice frame are all consonant signals, the processing unit further determines whether the original voice sampling signal corresponding to the target voice frame is the consonant signal according to a third ratio between a sum of the first frequency band signal energy and the second frequency band signal energy corresponding to the previous voice frame of the target voice frame and a sum of the first frequency band signal energy and the second frequency band signal energy corresponding to the previous voice frame of the previous voice frame of the target voice frame.

In an embodiment of the invention, the processing unit further calculates a zero crossing rate of the target voice frame, where when the original voice sampling signals corresponding to the previous two voice frames of the target voice frame are all consonant signals, the processing unit further determines whether the original voice sampling signal corresponding to the target voice frame is the consonant signal according to the zero crossing rate of the target voice frame, where when the zero crossing rate of the target voice frame is greater than a predetermined zero crossing rate, the first ratio is greater than a first predetermined value, the second ratio is smaller than a second predetermined value, and the third ratio is smaller than a third predetermined value, the original voice sampling signal corresponding to the target voice frame is the consonant signal, where the second predetermined value and the third predetermined value are smaller than or equal to 1.

In an embodiment of the invention, the processing unit further calculates a zero crossing rate of the target voice frame, where when the original voice sampling signal corresponding to the previous voice frame of the target voice frame is not the consonant signal, the processing unit determines whether the original voice sampling signal corresponding to the target voice frame is the consonant signal according to the zero crossing rate of the target voice frame, a sum of the first frequency band signal energy and the second frequency band signal energy corresponding to the target voice frame, and a third ratio between the second frequency band signal energy and the original voice sampling signal energy corresponding to the target voice frame, where when the zero crossing rate of the target voice frame is greater than a predetermined zero crossing rate, the sum of the first frequency band signal energy and the second frequency band signal energy corresponding to the target voice frame is greater than a first predetermined energy and the third ratio is greater than a first predetermined value, the original voice sampling signal corresponding to the target voice frame is the consonant signal.

In an embodiment of the invention, when the original voice sampling signal corresponding to the previous voice frame of the target voice frame is not the consonant signal, the processing unit further determines whether the original voice sampling signal corresponding to the target voice frame is the consonant signal according to the first ratio, where when the zero crossing rate of the target voice frame is greater than the predetermined zero crossing rate, the sum of the first frequency band signal energy and the second frequency band signal energy corresponding to the target voice frame is greater than the predetermined energy, the third ratio is greater than a second predetermined value and the first ratio is greater than a third predetermined value, the original voice sampling signal corresponding to the target voice frame is the consonant signal, where the first predetermined value is greater than the second predetermined value.

In an embodiment of the invention, the second frequency band is higher than the first frequency band.

The invention provides a voice signal processing method including following steps. Bandpass filtering of a first frequency band and a second frequency band is performed to a voice signal, so as to respectively generate a first bandpass filter signal and a second bandpass filter signal, where at least one of the first frequency band and the second frequency band is a consonant frequency band. The voice signal, the first bandpass filter signal and the second bandpass filter signal are divided into a plurality of voice frames. Energy of sampling signals in the voice frames is calculated, so as to obtain original voice sampling signal energy, first frequency band signal energy and second frequency band signal energy corresponding to the voice frames. A consonant signal judgement condition of a target voice frame is adjusted according to whether an original voice sampling signal corresponding to a previous voice frame of the target voice frame is a consonant signal, where the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal, where when the original voice sampling signal corresponding to the previous voice frame of the target voice frame is the consonant signal, it is determined whether the original voice sampling signal corresponding to the target voice frame is the consonant signal according to a first ratio between a sum of the first frequency band signal energy and the second frequency band signal energy corresponding to the target voice frame and the original voice sampling signal energy corresponding to the target voice frame, and a second ratio between the sum of the first frequency band signal energy and the second frequency band signal energy corresponding to the target voice frame and a sum of the first frequency band signal energy and the second frequency band signal energy corresponding to the previous voice frame of the target voice frame.

In an embodiment of the invention, the voice signal processing method further includes following steps. A zero crossing rate of the target voice frame is calculated. It is determined whether the original voice sampling signal corresponding to the previous voice frame of the target voice frame is the consonant signal. When the original voice sampling signal corresponding to the previous voice frame of the target voice frame is the consonant signal, it is determined whether the original voice sampling signal corresponding to the target voice frame is the consonant signal according to the zero crossing rate of the target voice frame, where when the zero crossing rate of the target voice frame is greater than a predetermined zero crossing rate, the first ratio is greater than a first predetermined value and the second ratio is greater than a second predetermined value, the original voice sampling signal corresponding to the target voice frame is the consonant signal.

In an embodiment of the invention, when the zero crossing rate of the target voice frame is greater than the predetermined zero crossing rate and the first ratio is greater than a third predetermined value, the original voice sampling signal corresponding to the target voice frame is the consonant signal, where the third predetermined value is greater than the first predetermined value.

In an embodiment of the invention, the voice signal processing method further includes following steps. It is determined whether the original voice sampling signals corresponding to previous two voice frames of the target voice frame are all consonant signals. When the original voice sampling signals corresponding to the previous two voice frames of the target voice frame are all consonant signals, it is determined whether the original voice sampling signal corresponding to the target voice frame is the consonant signal according to a third ratio between a sum of the first frequency band signal energy and the second frequency band signal energy corresponding to the previous voice frame of the target voice frame and a sum of the first frequency band signal energy and the second frequency band signal energy corresponding to the previous voice frame of the previous voice frame of the target voice frame.

In an embodiment of the invention, the voice signal processing method further includes following steps. A zero crossing rate of the target voice frame is calculated. It is determined whether the original voice sampling signals corresponding to previous two voice frames of the target voice frame are all consonant signals. When the original voice sampling signals corresponding to the previous two voice frames of the target voice frame are all consonant signals, it is determined whether the original voice sampling signal corresponding to the target voice frame is the consonant signal according to the zero crossing rate of the target voice frame, where when the zero crossing rate of the target voice frame is greater than a predetermined zero crossing rate, the first ratio is greater than a first predetermined value, the second ratio is smaller than a second predetermined value, and the third ratio is smaller than a third predetermined value, the original voice sampling signal corresponding to the target voice frame is the consonant signal, where the second predetermined value and the third predetermined value are smaller than or equal to 1.

In an embodiment of the invention, the voice signal processing method further includes following steps. A zero crossing rate of the target voice frame is calculated. It is determined whether the original voice sampling signal corresponding to the previous voice frame of the target voice frame is the consonant signal. When the original voice sampling signal corresponding to the previous voice frame of the target voice frame is not the consonant signal, it is determined whether the original voice sampling signal corresponding to the target voice frame is the consonant signal according to the zero crossing rate of the target voice frame, a sum of the first frequency band signal energy and the second frequency band signal energy corresponding to the target voice frame, and a third ratio between the second frequency band signal energy and the original voice sampling signal energy corresponding to the target voice frame, where when the zero crossing rate of the target voice frame is greater than a predetermined zero crossing rate, the sum of the first frequency band signal energy and the second frequency band signal energy corresponding to the target voice frame is greater than a predetermined energy and the third ratio is greater than a first predetermined value, the original voice sampling signal corresponding to the target voice frame is the consonant signal.

In an embodiment of the invention, when the original voice sampling signal corresponding to the previous voice frame of the target voice frame is not the consonant signal, the voice signal processing method further includes following steps. It is determined whether the original voice sampling signal corresponding to the target voice frame is the consonant signal according to the zero crossing rate of the target voice frame, the sum of the first frequency band signal energy and the second frequency band signal energy corresponding to the target voice frame, the third ratio and the first ratio, where when the zero crossing rate of the target voice frame is greater than the predetermined zero crossing rate, the sum of the first frequency band signal energy and the second frequency band signal energy corresponding to the target voice frame is greater than the predetermined energy, the third ratio is greater than a second predetermined value and the first ratio is greater than a third predetermined value, the original voice sampling signal corresponding to the target voice frame is the consonant signal, where the first predetermined value is greater than the second predetermined value.

In an embodiment of the invention, the second frequency band is higher than the first frequency band.

According to the above description, the consonant signal judgement condition of the target voice frame is adjusted according to whether the original voice sampling signal corresponding to the previous voice frame of the target voice frame is the consonant signal, where the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal. In this way, by adjusting the consonant signal judgement condition according to the voice frames before the target voice frame, the problem of sound intermittence caused by consonant signal misjudgement is mitigated, so as to improve comfort of listening to the sound and recognition of the voice signal.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
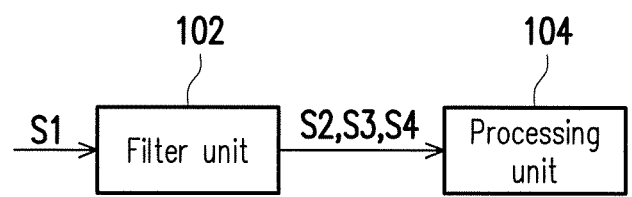
FIG. 1 is a schematic diagram of a voice signal processing apparatus according to an embodiment of the invention.

FIG. 1 is a schematic diagram of a voice signal processing apparatus according to an embodiment of the invention. Referring to FIG. 1, the voice signal processing apparatus includes a filter unit 102 and a processing unit 104. The filter unit 102 is coupled to the processing unit 104. The filter unit 102 may perform lowpass filtering and bandpass filtering of a first frequency band and a second frequency band to a voice signal S1, so as to respectively generate a lowpass filter signal S4, a first bandpass filter signal S2 and a second bandpass filter signal S3. The filter unit 102, for example, includes a lowpass filter and a bandpass filter, and the processing unit 104 is, for example, implemented by a central processing unit, though the invention is not limited thereto, and at least one of the first frequency band and the second frequency band is a consonant frequency band. For example, in the present embodiment, a cut off frequency of the lowpass filtering is 0-22 kHz, and the first frequency band and the second frequency band are respectively 2 kHz-4 kHz and 4 kHz-12 kHz, though the invention is not limited thereto.

The processing unit 104 may sample the voice signal S1, the first bandpass filter signal S2 and the second bandpass filter signal S3, and divides the voice signal S1, the first bandpass filter signal S2 and the second bandpass filter signal S3 into a plurality of voice frames, where each of the voice frames may include a sampling signal of N voice signals S1, a sampling signal of N first bandpass filter signal S2 and a sampling signal of N second bandpass filter signal S3, where N is a positive integer. The processing unit 104 may further calculate energy of the sampling signals in each of the voice frames, so as to obtain original voice sampling signal energy, first frequency band signal energy and second frequency band signal energy, where the original voice sampling signal energy, the first frequency band signal energy and the second frequency band signal energy respectively correspond to energy of the sampling signal of the voice signals S1, the sampling signal of the first bandpass filter signals S2 and the sampling signal of the second bandpass filter signals S3 in the voice frames.

After the original voice sampling signal energy, the first frequency band signal energy and the second frequency band signal energy are obtained, the processing unit 104 may adjust a consonant signal judgement condition of a target voice frame according to whether an original voice sampling signal corresponding to a previous voice frame of the target voice frame is a consonant signal, where the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal. Further, when the original voice sampling signal corresponding to the previous voice frame of the target voice frame is the consonant signal, the processing unit 104 may determine whether the original voice sampling signal corresponding to the target voice frame is the consonant signal according to a first ratio between a sum of the first frequency band signal energy and the second frequency band signal energy corresponding to the target voice frame and the original voice sampling signal energy corresponding to the target voice frame, and a second ratio between the sum of the first frequency band signal energy and the second frequency band signal energy corresponding to the target voice frame and a sum of the first frequency band signal energy and the second frequency band signal energy corresponding to the previous voice frame of the target voice frame. In some embodiments, the processing unit 104 may further calculate a zero crossing rate of the target voice frame, and determine whether the original voice sampling signal corresponding to the target voice frame is the consonant signal according to the zero crossing rate of the target voice frame.

When the original voice sampling signal corresponding to the target voice frame is not the consonant signal, the processing unit 104 may determine whether the original voice sampling signal corresponding to the target voice frame is the consonant signal according to the zero crossing rate of the target voice frame, the sum of the first frequency band signal energy and the second frequency band signal energy corresponding to the target voice frame, a ratio between the second frequency band signal energy and the original voice sampling signal energy corresponding to the target voice frame and the aforementioned first ratio. When the zero crossing rate of the target voice frame is greater than a predetermined zero crossing rate, the sum of the first frequency band signal energy and the second frequency band signal energy corresponding to the target voice frame is greater than a third predetermined value, and the first ratio is greater than a fourth predetermined value, the original voice sampling signal corresponding to the target voice frame is the consonant signal, where the second predetermined value is greater than the third predetermined value.

By adjusting the consonant signal judgement condition of the target voice frame according to whether the original voice sampling signal corresponding to the previous voice frame of the target voice frame is the consonant signal, where the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal, the problem of sound intermittence caused by consonant signal misjudgement can be effectively mitigated, so as to improve comfort of listening to the sound and recognition of the voice signal.

For example, when the original voice sampling signal corresponding to the previous voice frame of the target voice frame is the consonant signal, regarding the method that the processing unit 104 determines whether the original voice sampling signal corresponding to a target voice frame (for example, an $m^{th}$ voice frame, where m is a positive integer) is the consonant signal, a following equation can be used for determination:

$$W_m^+ = (I_m^{FL} | J_m^{FL}) \& K_m^{FL} \qquad (1)$$

Where, when $W_m^+ = 1$ represents that the original voice sampling signal corresponding to the $m^{th}$ voice frame is the consonant signal, and $W_{m-1}^+ = 0$ represents that the original voice sampling signal corresponding to the $m^{th}$ voice frame is not the consonant signal, namely, as long as $K_m^{FL}$ is 1, and one of $I_m^{FL}$ and $J_m^{FL}$ is 1, it is determined that the original voice sampling signal corresponding to the $m^{th}$ voice frame is the consonant signal. Moreover, $K_m^{FL}$, $J_m^{FL}$, $I_m^{FL}$ can be respectively represented by following equations:

$$K_m^{FL} \begin{cases} 1, & Z_m^0 \geq Z_{TH1} \\ 0, & else \end{cases} \qquad (2)$$

$$J_m^{FL} \begin{cases} 1, & \dfrac{EB1_m}{E_m} + \dfrac{EB2_m}{E_m} \geq \gamma_3 \\ 0, & else \end{cases} \qquad (3)$$

$$I_m^{FL} \begin{cases} 1, & \dfrac{EB1_m}{E_m} + \dfrac{EB2_m}{E_m} \geq \gamma_1 \& (EB1_m + EB2_m) \\ & \geq \gamma_2 (EB1_{m-1} + EB2_{m-1}) \\ 0, & else \end{cases} \qquad (4)$$

Where, $Z_m^0$ is a zero crossing rate of the $m^{th}$ voice frame, $Z_{TH1}$ is the predetermined zero crossing rate, which is, for example, set to 20, though the invention is not limited thereto. Moreover, $EB1_m$ is the first frequency band signal energy of the $m^{th}$ voice frame, $EB2_m$ is the second frequency band signal energy of the $m^{th}$ voice frame, $EB1_{m-1}$ is the first frequency band signal energy of the $(m-1)^{th}$ voice frame, $EB2_{m-1}$ is the second frequency band signal energy of the $(m-1)^{th}$ voice frame, $E_m$ is the original voice sampling signal energy of the $m^{th}$ voice frame, $\gamma_1$ is the first predetermined value, $\gamma_2$ is the second predetermined value, $\gamma_3$ is the third predetermined value, where $\gamma_3$ is greater than $\gamma_1$. For example, in the present embodiment, $\gamma_3$ can be 0.75, $\gamma_1$ can be 0.6, though the invention is not limited thereto. Moreover, the value of $\gamma_2$ can be set according to the requirement of the designer. For example, in the present embodiment, $\gamma_2$ can be 0.8, though the invention is not limited thereto, and in other embodiments, the value of $\gamma_2$ can also be 1.1, 1, 0.9 or 0.7.

Moreover, when the original voice sampling signal corresponding to the previous voice frame of the target voice frame is not the consonant signal, regarding the method that the processing unit 104 determines whether the original voice sampling signal corresponding to the $m^{th}$ voice frame is the consonant signal, a following equation can be used for determination:

$$W_m^+ = (D_m^{FL} | F_m^{FL}) \& H_m^{FL} \qquad (5)$$

Similarly, when $W_m^+=1$ represents that the original voice sampling signal corresponding to the $m^{th}$ voice frame is the consonant signal, and $W_{m-1}^+=0$ represents that the original voice sampling signal corresponding to the $m^{th}$ voice frame is not the consonant signal, namely, as long as $H_m^{FL}$ is 1, and one of $D_m^{FL}$ and $F_m^{FL}$ is 1, it is determined that the original voice sampling signal corresponding to the $m^{th}$ voice frame is the consonant signal. Moreover, $H_m^{FL}$, $D_m^{FL}$, $F_m^{FL}$ can be respectively represented by following equations:

$$H_m^{FL} \begin{cases} 1, & EB1_m + EB2_m \geq E_{TH} \ \& \ Z_m^0 \geq Z_{TH} \\ 0, & else \end{cases} \quad (6)$$

$$D_m^{FL} \begin{cases} 1, & \dfrac{EB2_m}{E_m} \geq \alpha_1 \\ 0, & else \end{cases} \quad (7)$$

$$F_m^{FL} \begin{cases} 1, & \dfrac{EB2_m}{E_m} \geq \alpha_2 \ \& \ \dfrac{EB1_m}{E_m} + \dfrac{EB2_m}{E_m} \geq \alpha_3 \\ 0, & else \end{cases} \quad (8)$$

Where, $E_{TH}$ is predetermined energy, which is, for example, set to 24, though the invention is not limited thereto. $Z_m^0$ is the zero crossing rate of the $m^{th}$ voice frame, $Z_{TH}$ is the predetermined zero crossing rate, which is, for example, set to 22, though the invention is not limited thereto. Moreover, $\alpha_1$ is the fourth predetermined value, $\alpha_2$ is a fifth predetermined value, $\alpha_3$ is a sixth predetermined value, where $\alpha_1$ is greater than $\alpha_2$, for example, in the present embodiment, $\alpha_1$ can be 0.8, $\alpha_2$ can be 0.35, though the invention is not limited thereto. Moreover, the value of $\alpha_3$ can be set according to the requirement of the designer, for example, in the present embodiment, $\alpha_3$ can be 1, though the invention is not limited thereto.

It should be noted that the aforementioned predetermined energy and setting of the predetermined values are only an example, and the invention is not limited to the aforementioned values, and as long as the predetermined energy and the setting of the predetermined values may make the consonant signal judgement condition obtained when the original voice sampling signal corresponding to the $(m-1)^{th}$ voice frame is the consonant signal to be looser than the consonant signal judgement condition obtained when the original voice sampling signal corresponding to the $(m-1)^{th}$ voice frame is not the consonant signal, it is considered to be complied with the spirit of the invention.

Moreover, in some embodiment, the processing unit 104 may also adjust the consonant signal judgement condition of the target voice frame according to whether the original voice sampling signals corresponding to a plurality of previous voice frames of the target voice frame are the consonant signals, so as to further avoid misjudging the consonant signals. For example, when the original voice sampling signals corresponding to previous two voice frames (the $(m-1)^{th}$ voice frame and the $(m-2)^{th}$ voice frame) of the target voice frame (the $m^{th}$ voice frame) are all consonant signals, the processing unit 104 may determine whether the original voice sampling signal corresponding to the $m^{th}$ voice frame is the consonant signal according to a ratio between a sum of the first frequency band signal energy and the second frequency band signal energy corresponding to the $(m-1)^{th}$ voice frame and a sum of the first frequency band signal energy and the second frequency band signal energy corresponding to the $(m-2)^{th}$ voice frame. Namely, the aforementioned $F_m^{FL}$ can be represented by a following equation:

$$I_m^{FL} \begin{cases} \dfrac{EB1_m}{E_m} + \dfrac{EB2_m}{E_m} \geq k_1 \ \& \ \dfrac{(EB1_m + EB2_m)}{(EB1_{m-1} + EB2_{m-1})} \\ 1, \quad < k_2 \ \& \ \dfrac{(EB1_{m-1} + EB2_{m-1})}{(EB1_{m-2} + EB2_{m-2})} < k_3 \\ 0, \quad else \end{cases} \quad (9)$$

Where, $k_1$ is a seventh predetermined value, $k_2$ is an eighth predetermined value, $k_3$ is a ninth predetermined value, where $k_1$ is smaller than $\gamma_1$ of the aforementioned equation (4), and $k_1$ is, for example, 0.5, though the invention is not limited thereto, and the value thereof can be set according to the requirement of the designer. $k_2$ and $k_3$ can be, for example, set to values smaller than or equal to 1, though the invention is not limited thereto. Deduced by analogy, it can be determined whether the original voice sampling signal corresponding to the target voice frame is the consonant signal according to the original voice sampling signals corresponding to more previous voice frames of the target voice frame, and determination method thereof is similar to the determination method of using the original voice sampling signals corresponding to the previous two voice frames of the target voice frame to perform the consonant signal judgement, which is not repeated. The processing unit 104 may perform frequency down-conversion on the original voice sampling signal that is judged as a consonant signal, and the frequency down-converted consonant signal may be output by a speaker of the voice signal processing apparatus.

Figure 2:
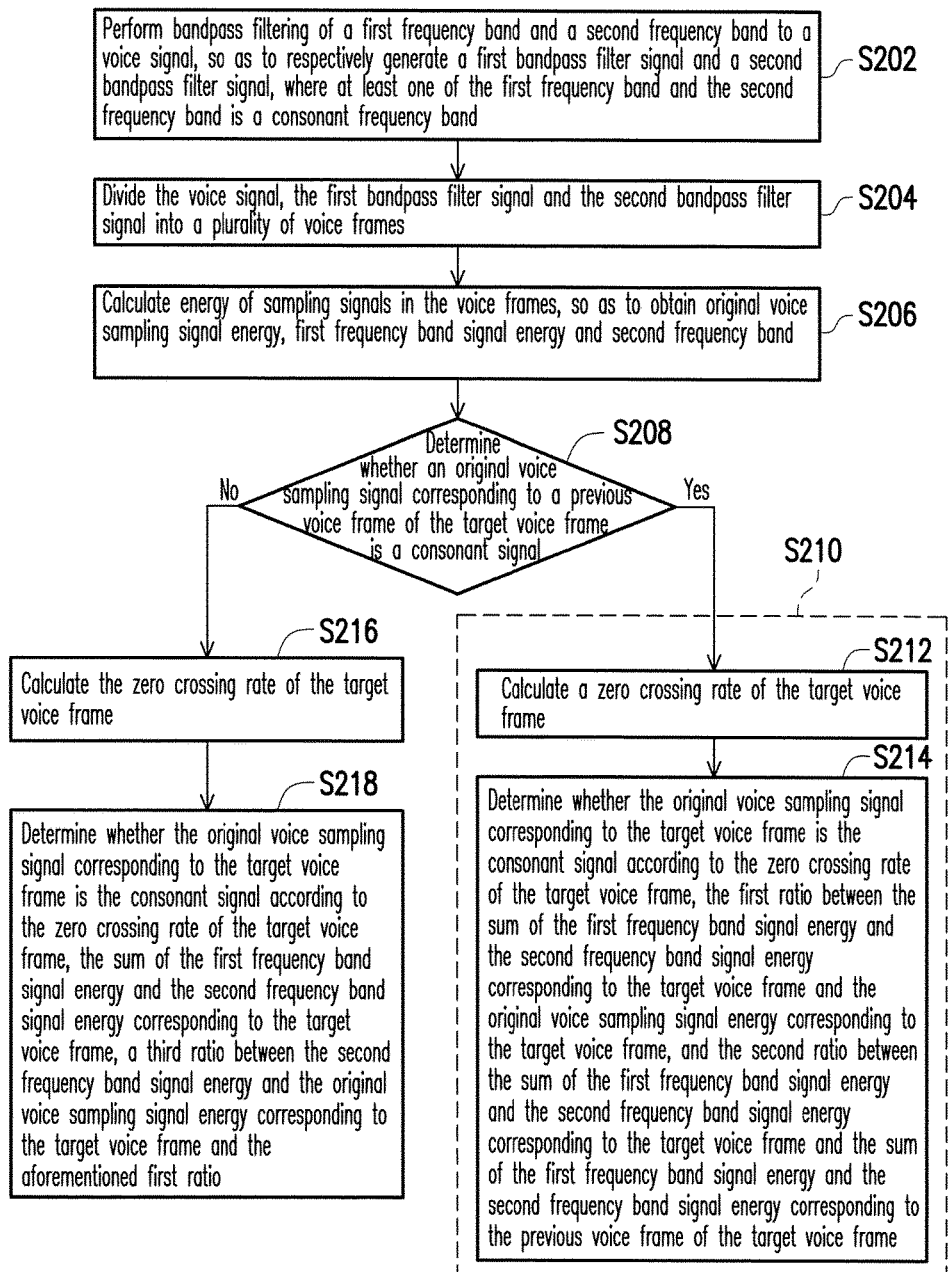
FIG. 2 is a flowchart illustrating a voice signal processing method according to an embodiment of the invention.

FIG. 2 is a flowchart illustrating a voice signal processing method according to an embodiment of the invention. Referring to FIG. 2, according to the aforementioned embodiment, it is known that the voice signal processing method of the voice signal processing apparatus includes following steps. First, bandpass filtering of a first frequency band and a second frequency band is performed to a voice signal, so as to respectively generate a first bandpass filter signal and a second bandpass filter signal, where at least one of the first frequency band and the second frequency band is a consonant frequency band (step S202). Then, the voice signal, the first bandpass filter signal and the second bandpass filter signal are divided into a plurality of voice frames (step S204). Then, energy of sampling signals in the voice frames is calculated, so as to obtain original voice sampling signal energy, first frequency band signal energy and second frequency band signal energy corresponding to the voice frames (step S206). Then, it is determined whether an original voice sampling signal corresponding to a previous voice frame of the target voice frame is a consonant signal (step S208). When the original voice sampling signal corresponding to the previous voice frame of the target voice frame is the consonant signal, it is determined whether the original voice sampling signal corresponding to the target voice frame is the consonant signal according to a first ratio between a sum of the first frequency band signal energy and the second frequency band signal energy corresponding to the target voice frame and the original voice sampling signal energy corresponding to the target voice frame, and a second ratio between the sum of the first frequency band signal energy and the second frequency band signal energy corresponding to the target voice frame and a sum of the first frequency band signal energy and the second frequency band signal energy corresponding to the previous voice frame of the target voice frame (step S210).

In some embodiments, as shown in FIG. 2, the step S210 may include following steps. A zero crossing rate of the target voice frame is first calculated (step S212), and then it is determined whether the original voice sampling signal corresponding to the target voice frame is the consonant signal according to the zero crossing rate of the target voice frame, the first ratio between the sum of the first frequency band signal energy and the second frequency band signal energy corresponding to the target voice frame and the original voice sampling signal energy corresponding to the target voice frame, and the second ratio between the sum of the first frequency band signal energy and the second frequency band signal energy corresponding to the target voice frame and the sum of the first frequency band signal energy and the second frequency band signal energy corresponding to the previous voice frame of the target voice frame (step S214). When the zero crossing rate of the target voice frame is greater than a predetermined zero crossing rate, the first ratio is greater than a first predetermined value and the second ratio is greater than a second predetermined value, the original voice sampling signal corresponding to the target voice frame is the consonant signal. Moreover, when the zero crossing rate of the target voice frame is greater than the predetermined zero crossing rate and the first ratio is greater than a third predetermined value, it is also determined that the original voice sampling signal corresponding to the target voice frame is the consonant signal, where the third predetermined value is greater than the first predetermined value.

Moreover, in the step S208, if it is determined that the original voice sampling signal corresponding to the previous voice frame of the target voice frame is not the consonant signal, the zero crossing rate of the target voice frame is calculated (step S216), and then it is determined whether the original voice sampling signal corresponding to the target voice frame is the consonant signal according to the zero crossing rate of the target voice frame, the sum of the first frequency band signal energy and the second frequency band signal energy corresponding to the target voice frame, a third ratio between the second frequency band signal energy and the original voice sampling signal energy corresponding to the target voice frame and the aforementioned first ratio (step S218). When the zero crossing rate of the target voice frame is greater than a predetermined zero crossing rate, the sum of the first frequency band signal energy and the second frequency band signal energy corresponding to the target voice frame is greater than the predetermined energy, and the third ratio is greater than a fourth predetermined value, it can be determined that the original voice sampling signal corresponding to the target voice frame is the consonant signal. Moreover, when the zero crossing rate of the target voice frame is greater than the predetermined zero crossing rate, the sum of the first frequency band signal energy and the second frequency band signal energy corresponding to the target voice frame is greater than the predetermined energy, the third ratio is greater than a fifth predetermined value and the first ratio is greater than a sixth predetermined value, it can also be determined that the original voice sampling signal corresponding to the target voice frame is the consonant signal, where the fourth predetermined value is greater than the fifth predetermined value.

Figure 3:
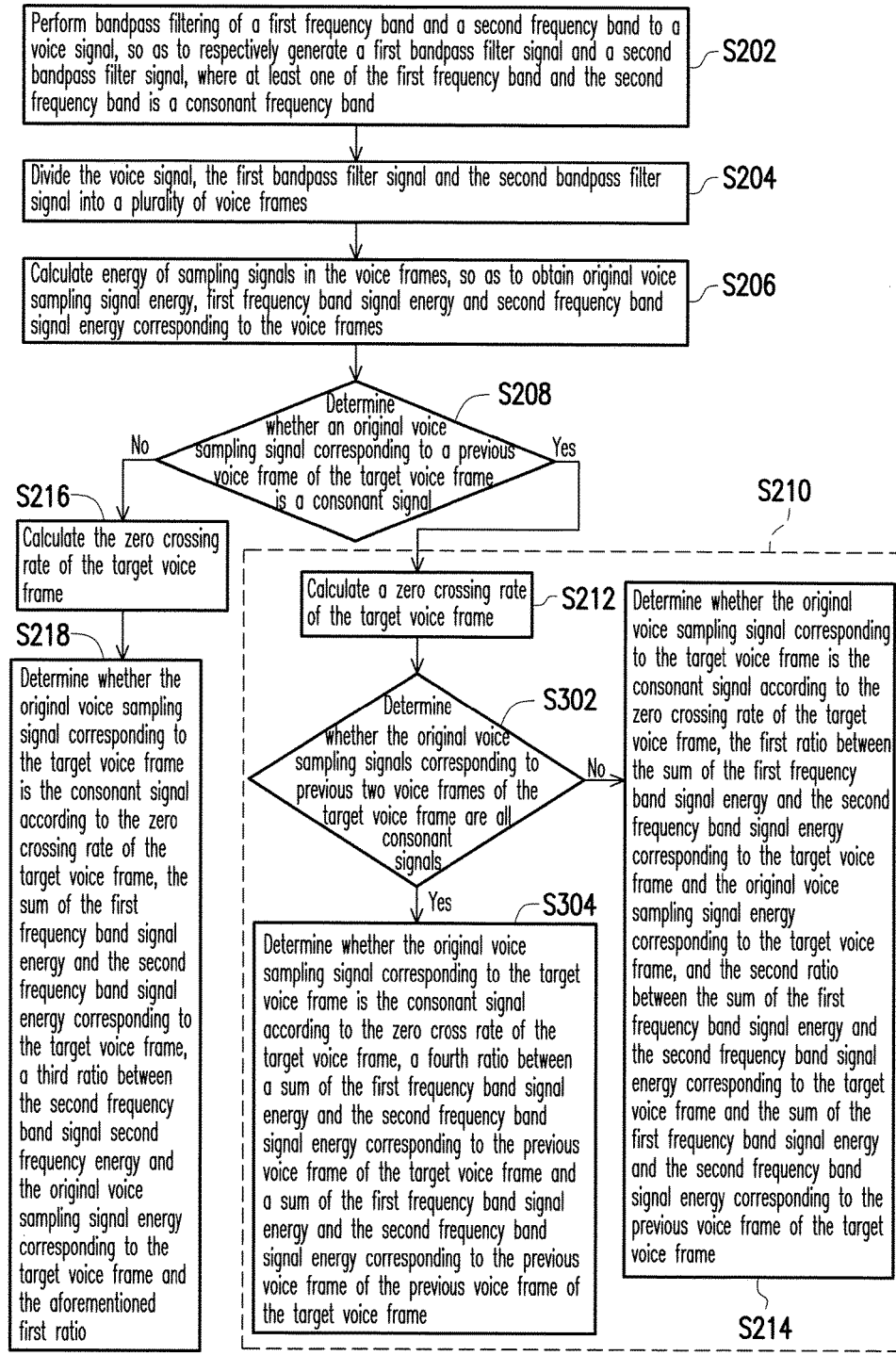
FIG. 3 is a flowchart illustrating a voice signal processing method according to another embodiment of the invention.

FIG. 3 is a flowchart illustrating a voice signal processing method according to another embodiment of the invention. Referring to FIG. 3, a difference between the present embodiment and the embodiment of FIG. 2 is that the step S210 may include steps of adjusting the consonant signal judgement condition according to original voice sampling signals corresponding to previous two voice frames of the target voice frame. As shown in FIG. 3, after the step S212, it is further determined whether the original voice sampling signals corresponding to previous two voice frames of the target voice frame are all consonant signals (step S302). When the original voice sampling signals corresponding to the previous two voice frames of the target voice frame are all consonant signals, it is determined whether the original voice sampling signal corresponding to the target voice frame is the consonant signal according to the zero cross rate of the target voice frame, a fourth ratio between a sum of the first frequency band signal energy and the second frequency band signal energy corresponding to the previous voice frame of the target voice frame and a sum of the first frequency band signal energy and the second frequency band signal energy corresponding to the previous voice frame of the previous voice frame of the target voice frame (step S304). When the zero crossing rate of the target voice frame is greater than the predetermined zero crossing rate, the first ratio is greater than a seventh predetermined value, the second ratio is smaller than an eighth predetermined value, and the fourth ratio is smaller than a ninth predetermined value, it can be determined that the original voice sampling signal corresponding to the target voice frame is the consonant signal, where the eighth predetermined value and the ninth predetermined value are smaller than or equal to 1.

In summary, the consonant signal judgement condition of the target voice frame is adjusted according to whether the original voice sampling signal corresponding to the previous voice frame of the target voice frame is the consonant signal, where the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal. In this way, by adjusting the consonant signal judgement condition according to the voice frames before the target voice frame, the problem of sound intermittence caused by consonant signal misjudgement is mitigated, so as to improve comfort of listening to the sound and recognition of the voice signal.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A voice signal processing apparatus, comprising:
a bandpass filter unit, performing bandpass filtering of a first frequency band and a second frequency band to a voice signal, so as to respectively generate a first bandpass filter signal and a second bandpass filter signal, wherein at least one of the first frequency band and the second frequency band is a consonant frequency band; and
a processing unit, coupled to the bandpass filter unit, dividing the voice signal, the first bandpass filter signal and the second bandpass filter signal into a plurality of voice frames, and calculating energy of sampling signals in the voice frames to obtain original voice sampling signal energy, first frequency band signal energy and second frequency band signal energy corresponding to the voice frames, and adjusting a consonant signal judgement condition of a target voice frame according to whether an original voice sampling signal corresponding to a previous voice frame of the target voice frame is a consonant signal, wherein the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal, wherein when the original voice sampling signal corresponding to the previous voice frame of the target voice frame is the consonant signal, the processing unit determines whether the original voice sampling signal corresponding to the target voice frame is the consonant signal according to a first ratio between a sum of the first frequency band signal energy and the second frequency band signal energy corresponding to the target voice frame and the original voice sampling signal energy corresponding to the target voice frame, and a second ratio between the sum of the first frequency band signal energy and the second frequency band signal energy corresponding to the target voice frame and a sum of the first frequency band signal energy and the second frequency band signal energy corresponding to the previous voice frame of the target voice frame, and wherein the processing unit further performs a frequency down-conversion on the original voice sampling signal corresponding to the target voice frame which is determined as the consonant signal.

2. The voice signal processing apparatus as claimed in claim 1, wherein the processing unit further calculates a zero crossing rate of the target voice frame, and when the original voice sampling signal corresponding to the previous voice frame of the target voice frame is the consonant signal, the processing unit further determines whether the original voice sampling signal corresponding to the target voice frame is the consonant signal according to the zero crossing rate of the target voice frame, wherein when the zero crossing rate of the target voice frame is greater than a predetermined zero crossing rate, the first ratio is greater than a first predetermined value and the second ratio is greater than a second predetermined value, the original voice sampling signal corresponding to the target voice frame is the consonant signal.

3. The voice signal processing apparatus as claimed in claim 2, wherein when the zero crossing rate of the target voice frame is greater than the predetermined zero crossing rate and the first ratio is greater than a third predetermined value, the original voice sampling signal corresponding to the target voice frame is the consonant signal, wherein the third predetermined value is greater than the first predetermined value.

4. The voice signal processing apparatus as claimed in claim 1, wherein when original voice sampling signals corresponding to previous two voice frames of the target voice frame are all consonant signals, the processing unit further determines whether the original voice sampling signal corresponding to the target voice frame is the consonant signal according to a third ratio between a sum of the first frequency band signal energy and the second frequency band signal energy corresponding to the previous voice frame of the target voice frame and a sum of the first frequency band signal energy and the second frequency band signal energy corresponding to the previous voice frame of the previous voice frame of the target voice frame.

5. The voice signal processing apparatus as claimed in claim 4, wherein the processing unit further calculates a zero crossing rate of the target voice frame, and when the original voice sampling signals corresponding to the previous two voice frames of the target voice frame are all consonant signals, the processing unit further determines whether the original voice sampling signal corresponding to the target voice frame is the consonant signal according to the zero crossing rate of the target voice frame, and when the zero crossing rate of the target voice frame is greater than a predetermined zero crossing rate, the first ratio is greater than a first predetermined value, the second ratio is smaller than a second predetermined value, and the third ratio is smaller than a third predetermined value, the original voice sampling signal corresponding to the target voice frame is the consonant signal, wherein the second predetermined value and the third predetermined value are smaller than or equal to 1.

6. The voice signal processing apparatus as claimed in claim 1, wherein the processing unit further calculates a zero crossing rate of the target voice frame, and when the original voice sampling signal corresponding to the previous voice frame of the target voice frame is not the consonant signal, the processing unit determines whether the original voice sampling signal corresponding to the target voice frame is the consonant signal according to the zero crossing rate of the target voice frame, a sum of the first frequency band signal energy and the second frequency band signal energy corresponding to the target voice frame, and a third ratio between the second frequency band signal energy and the original voice sampling signal energy corresponding to the target voice frame, wherein when the zero crossing rate of the target voice frame is greater than a predetermined zero crossing rate, the sum of the first frequency band signal energy and the second frequency band signal energy corresponding to the target voice frame is greater than a first predetermined energy and the third ratio is greater than a first predetermined value, the original voice sampling signal corresponding to the target voice frame is the consonant signal.

7. The voice signal processing apparatus as claimed in claim 6, wherein when the original voice sampling signal corresponding to the previous voice frame of the target voice frame is not the consonant signal, the processing unit further determines whether the original voice sampling signal corresponding to the target voice frame is the consonant signal according to the first ratio, wherein when the zero crossing rate of the target voice frame is greater than the predetermined zero crossing rate, the sum of the first frequency band signal energy and the second frequency band signal energy corresponding to the target voice frame is greater than the predetermined energy, the third ratio is greater than a second predetermined value and the first ratio is greater than a third predetermined value, the original voice sampling signal corresponding to the target voice frame is the consonant signal, wherein the first predetermined value is greater than the second predetermined value.

8. The voice signal processing apparatus as claimed in claim 1, wherein the second frequency band is higher than the first frequency band.

9. A voice signal processing method, comprising:
performing bandpass filtering of a first frequency band and a second frequency band to a voice signal, so as to respectively generate a first bandpass filter signal and a second bandpass filter signal, wherein at least one of the first frequency band and the second frequency band is a consonant frequency band;

dividing the voice signal, the first bandpass filter signal and the second bandpass filter signal into a plurality of voice frames;

calculating energy of sampling signals in the voice frames, so as to obtain original voice sampling signal energy, first frequency band signal energy and second frequency band signal energy corresponding to the voice frames; and adjusting a consonant signal judgement condition of a target voice frame according to whether an original voice sampling signal corresponding to a previous voice frame of the target voice frame is a consonant signal, wherein the consonant signal judgement condition of the target voice frame obtained when the original voice sampling signal corresponding to the previous voice frame of the target voice frame is the consonant signal is looser than the consonant signal judgement condition of the target voice frame obtained when the original voice sampling signal corresponding to the previous voice frame of the target voice frame is not the consonant signal, wherein when the original voice sampling signal corresponding to the previous voice frame of the target voice frame is the consonant signal, it is determined whether the original voice sampling signal corresponding to the target voice frame is the consonant signal according to a first ratio between a sum of the first frequency band signal energy and the second frequency band signal energy corresponding to the target voice frame and the original voice sampling signal energy corresponding to the target voice frame, and a second ratio between the sum of the first frequency band signal energy and the second frequency band signal energy corresponding to the target voice frame and a sum of the first frequency band signal energy and the second frequency band signal energy corresponding to the previous voice frame of the target voice frame, and wherein the processing unit further performs a frequency down-conversion on the original voice sampling signal corresponding to the target voice frame which is determined as the consonant signal.

10. The voice signal processing method as claimed in claim 9, further comprising:

calculating a zero crossing rate of the target voice frame;

determining whether the original voice sampling signal corresponding to the previous voice frame of the target voice frame is the consonant signal; and determining whether the original voice sampling signal corresponding to the target voice frame is the consonant signal according to the zero crossing rate of the target voice frame when the original voice sampling signal corresponding to the previous voice frame of the target voice frame is the consonant signal, wherein when the zero crossing rate of the target voice frame is greater than a predetermined zero crossing rate, the first ratio is greater than a first predetermined value and the second ratio is greater than a second predetermined value, the original voice sampling signal corresponding to the target voice frame is the consonant signal.

11. The voice signal processing method as claimed in claim 10, wherein when the zero crossing rate of the target voice frame is greater than the predetermined zero crossing rate and the first ratio is greater than a third predetermined value, the original voice sampling signal corresponding to the target voice frame is the consonant signal, wherein the third predetermined value is greater than the first predetermined value.

12. The voice signal processing method as claimed in claim 9, further comprising:

determining whether the original voice sampling signals corresponding to previous two voice frames of the target voice frame are all consonant signals; and determining whether the original voice sampling signal corresponding to the target voice frame is the consonant signal according to a third ratio between a sum of the first frequency band signal energy and the second frequency band signal energy corresponding to the previous voice frame of the target voice frame and a sum of the first frequency band signal energy and the second frequency band signal energy corresponding to the previous voice frame of the previous voice frame of the target voice frame when the original voice sampling signals corresponding to the previous two voice frames of the target voice frame are all consonant signals.

13. The voice signal processing method as claimed in claim 12, further comprising:

calculating a zero crossing rate of the target voice frame;

determining whether the original voice sampling signals corresponding to previous two voice frames of the target voice frame are all consonant signals; and determining whether the original voice sampling signal corresponding to the target voice frame is the consonant signal according to the zero crossing rate of the target voice frame when the original voice sampling signals corresponding to the previous two voice frames of the target voice frame are all consonant signals, wherein when the zero crossing rate of the target voice frame is greater than a predetermined zero crossing rate, the first ratio is greater than a first predetermined value, the second ratio is smaller than a second predetermined value, and the third ratio is smaller than a third predetermined value, the original voice sampling signal corresponding to the target voice frame is the consonant signal, wherein the second predetermined value and the third predetermined value are smaller than or equal to 1.

14. The voice signal processing method as claimed in claim 9, further comprising:

calculating a zero crossing rate of the target voice frame;

determined whether the original voice sampling signal corresponding to the previous voice frame of the target voice frame is the consonant signal; and determining whether the original voice sampling signal corresponding to the target voice frame is the consonant signal according to the zero crossing rate of the target voice frame, a sum of the first frequency band signal energy and the second frequency band signal energy corresponding to the target voice frame, and a third ratio between the second frequency band signal energy and the original voice sampling signal energy corresponding to the target voice frame when the original voice sampling signal corresponding to the previous voice frame of the target voice frame is not the consonant signal, wherein when the zero crossing rate of the target voice frame is greater than a predetermined zero crossing rate, the sum of the first frequency band signal energy and the second frequency band signal energy corresponding to the target voice frame is greater than a predetermined energy and the third ratio is greater than a first predetermined value, the original voice sampling signal corresponding to the target voice frame is the consonant signal.

15. The voice signal processing method as claimed in claim 14, wherein when the original voice sampling signal corresponding to the previous voice frame of the target voice frame is not the consonant signal, the voice signal processing method further comprises:

determining whether the original voice sampling signal corresponding to the target voice frame is the consonant signal according to the zero crossing rate of the target voice frame, the sum of the first frequency band signal energy and the second frequency band signal energy corresponding to the target voice frame, the third ratio and the first ratio, wherein when the zero crossing rate of the target voice frame is greater than the predetermined zero crossing rate, the sum of the first frequency band signal energy and the second frequency band signal energy corresponding to the target voice frame is greater than the predetermined energy, the third ratio is greater than a second predetermined value and the first ratio is greater than a third predetermined value, the original voice sampling signal corresponding to the target voice frame is the consonant signal, wherein the first predetermined value is greater than the second predetermined value.

16. The voice signal processing method as claimed in claim 9, wherein the second frequency band is higher than the first frequency band.

* * * * *